June 8, 1926.
E. KLINGBEIL
1,588,116
CLEANING DEVICE
Filed July 9, 1924
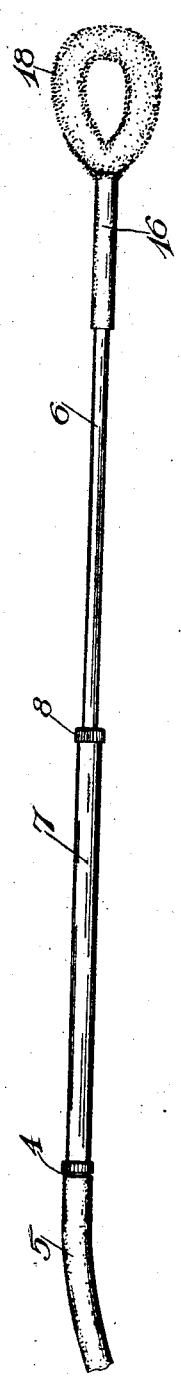
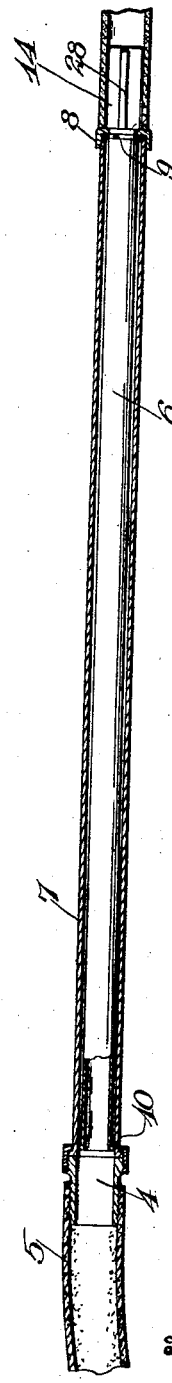
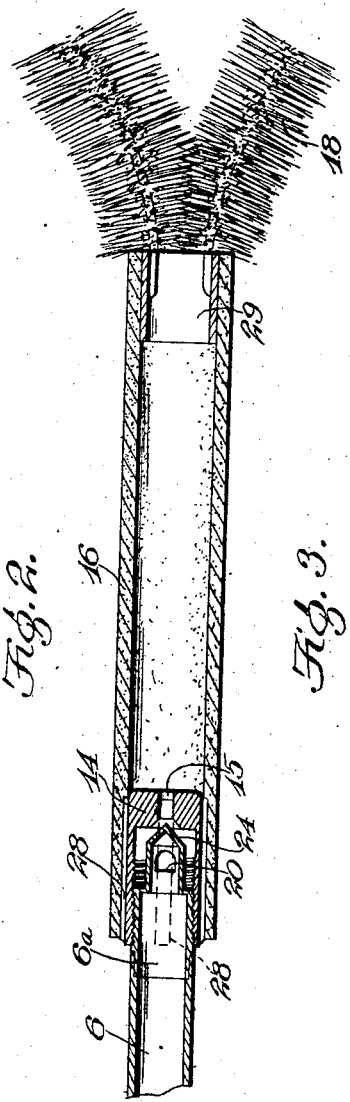
Inventor:-
Edward Klingbeil
By Milo B. Stevens
Attorneys.

Patented June 8, 1926.

1,588,116

UNITED STATES PATENT OFFICE.

EDWARD KLINGBEIL, OF OAK PARK, ILLINOIS.

CLEANING DEVICE.

Application filed July 9, 1924. Serial No. 725,055.

This invention relates to cleaning devices especially adapted for use in connection with automobiles though not necessarily restricted to such use.

An important object of this invention is to provide a fountain brush having simple means whereby the same may be employed to gain access to inconvenient places on an automobile such as the running gear and the fenders.

A further object is to provide a cleaning device of the character specified which has its forward portion composed principally of rubber and other yieldable parts so that the same will not be likely to scratch or mar the automobile.

A further object is to provide a fountain brush of the character specified which may be conveniently collapsed for storage in the rear seat of an automobile or other convenient place.

A further object is to provide a fountain brush which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a side elevation of the improved fountain brush;

Fig. 2 is a detail sectional view illustrating the collapsible handle of the brush; and Fig. 3 is an enlarged sectional view illustrating the water control valve and the particular means to secure the brush to the flexible forward end of the handle.

In the drawing, wherein for the purpose of illustration is shown a preferred embodiment of the invention, the numeral 5 designates an ordinary lawn hose having its forward end provided with a coupling 4 by means of which the same may be connected to the rear section 7 of the handle of the improved fountain brush.

Fig. 2 illustrates that the rear section 7 of the handle of the improved brush slidably receives the forward section 6 so that the brush when disconnected from the hose 5 may be placed in the rear seat of an automobile or any other convenient storage space. The forward portion of the rear section 7 has connection with a cap 8 which holds a gasket 9 firmly in position about the periphery of the section 6 to establish an absolutely liquid tight connection between the sections 6 and 7. The rear portion of the forward section 6 is provided with an annular flange 10 which is adapted to contact with the section 7 and receive the extension of the handle and also cooperate with the gasket in the formation of an absolutely liquid tight joint.

With particular reference to Figure 3, it will be observed that the forward portion of the section 6 is provided with a nozzle 14 having a centrally arranged water discharge opening 15 by means of which the water may be conveyed to the flexible shank 16 of the brush head 18.

Before describing the brush head it may be pointed out that the forward portion $6^a$ of the section 6 is provided with oppositely arranged discharge openings 20 by means of which the water may enter the nozzle and as the nozzle 14 is threaded on the section $6^a$ it may be conveniently adjusted so that the cone-shaped forward end 24 of the section 6 may be approached or engaged by the cone-shaped valve seat in the nozzle 14. When the cone-shaped forward end 24 is released from the cone-shaped seat of the nozzle 14 by unscrewing the latter, the opening 15 is uncovered so that the water may be freely discharged.

Fig. 2 plainly illustrates that the nozzle 14 is provided with longitudinally extending external ribs 28 which engage the inner side of the flexible shank 16 and thereby securely connect the flexible shank to the handle. Of course, the ribs 28 imbed themselves in the material forming the shank 16 so that turning or slipping of the shank is prevented.

The brush head 18 is formed from a length of wire, the rear ends of which are secured in any suitable manner in at attaching band 29 which is in turn secured in the forward end of the flexible shank 16. The length of wire which forms the body of the brush head has connection with a plurality of bristles of any suitable material or if found desirable strands of cotton or wool may be employed in the manufacture of the brush head. The specific material from which the brush head is formed constitutes no part of this invention and it is understood that any desired material may be employed and that such minor changes in construction and arrangement of the various parts may be made in the manufacture as will remain within the spirit of the invention and the scope of what is claimed.

In the use of the improved brush, the handle is first extended to its full length and is then connected to the lawn hose 5. The flow of water is now started and by an adjustment of the nozzle 14 the water discharged at the brush head may be regulated. The water discharges at the point of contact of the brush with the work and consequently the dirt and grease is loosened by the combined action of the water and the brush. A brush constructed in accordance with this invention forms a convenient means for gaining access to inconvenient places on a automobile and when the device is not in use it may be conveniently and compactly stored in the rear seat of an automobile or any other place found desirable.

Attention is especially directed to the fact that during the use of the brush the effective length of the handle may be varied by adjustment of the sections 6 and 7 with respect to each other.

Having thus described the invention, what is claimed is:

A fountain brush comprising a handle, the forward end of the handle having outlet openings and a cone shaped forward end, a member of integral construction having a cone shaped valve seat to cooperate with the forward cone-shaped end of said handle for regulating the water, a flexible tube entirely receiving said member and said cone shaped forward end to protect the same, a brush arranged at the forward end of said tube, said integral member being threaded upon said handle so that upon rotation of said handle relative to said cone shaped valve seat the cone shaped end thereof will approach or recede from said cone shaped valve seat.

In testimony whereof I affix my signature.

EDWARD KLINGBEIL.